United States Patent
Hodgson et al.

(10) Patent No.: US 8,683,785 B2
(45) Date of Patent: Apr. 1, 2014

(54) METHOD FOR REGENERATING AN OPEN PARTICLE SEPARATOR AND MOTOR VEHICLE HAVING AT LEAST ONE OPEN PARTICLE SEPARATOR

(75) Inventors: Jan Hodgson, Troisdorf (DE); Rolf Brück, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 67 days.

(21) Appl. No.: 13/113,267

(22) Filed: May 23, 2011

(65) Prior Publication Data
US 2011/0225957 A1    Sep. 22, 2011

Related U.S. Application Data

(63) Continuation of application No. PCT/EP2009/064657, filed on Nov. 5, 2009.

(30) Foreign Application Priority Data

Nov. 21, 2008   (DE) .......................... 10 2008 058 418

(51) Int. Cl.
*F01N 3/00* (2006.01)
*F01N 3/02* (2006.01)

(52) U.S. Cl.
USPC .................. 60/295; 60/274; 60/276; 60/285; 60/297; 60/311

(58) Field of Classification Search
USPC .................. 60/274, 276, 285, 295, 297, 311
See application file for complete search history.

(56) References Cited

U.S. PATENT DOCUMENTS

| 5,826,425 A | 10/1998 | Rossi Sebastiano et al. |
| 7,249,456 B2 | 7/2007 | Schulte et al. |
| 2005/0235634 A1 | 10/2005 | Schulte et al. |
| 2007/0157601 A1 | 7/2007 | Tominaga |

FOREIGN PATENT DOCUMENTS

| DE | 37 29 857 C1 | 11/1998 |
| DE | 103 01 035 A1 | 7/2004 |
| JP | 2005180241 A | 7/2005 |
| WO | 96/03571 A1 | 2/1996 |

OTHER PUBLICATIONS

International Search Report of PCT/EP2009/064657 Dated Feb. 16, 2010.

*Primary Examiner* — Thomas Denion
*Assistant Examiner* — Diem Tran
(74) *Attorney, Agent, or Firm* — Laurence A. Greenberg; Werner H. Stemer; Ralph E. Locher

(57) ABSTRACT

A method for regenerating an open particle separator includes at least determining at least one parameter, as a characteristic variable of a regeneration capability of the open particle separator. The at least one parameter is compared with a first threshold value. At least one portion of a comparison period during which the parameter has reached the first threshold value is determined. The portion is compared with a first minimum portion corresponding to a minimum regeneration time in the comparison time period. Measures are initiated to influence the parameter so that the parameter lies at least according to the first minimum portion and the first threshold value is reached and/or the open particle separator is regenerated. A motor vehicle having at least one open particle separator is also provided.

6 Claims, 2 Drawing Sheets

METHOD FOR REGENERATING AN OPEN PARTICLE SEPARATOR AND MOTOR VEHICLE HAVING AT LEAST ONE OPEN PARTICLE SEPARATOR

CROSS-REFERENCE TO RELATED APPLICATION

This is a continuation, under 35 U.S.C. §120, of copending International Application No. PCT/EP2009/064657, filed Nov. 5, 2009, which designated the United States; this application also claims the priority, under 35 U.S.C. §119, of German Patent Application DE 10 2008 058 418.5, filed Nov. 21, 2008; the prior applications are herewith incorporated by reference in their entirety.

BACKGROUND OF THE INVENTION

Field of the Invention

The present invention relates to a method for regenerating an open particle separator and a motor vehicle having at least one open particle separator.

Particle separators are used for the purification of exhaust gases of an internal combustion engine of a motor vehicle, preferably of a diesel engine. In recent years, the significance of particle separators for the purification of the exhaust gases of diesel internal combustion engines has increased considerably due to the discussion of fine dust emissions. The first particle separators in the automotive field, which are widespread nowadays, were closed particle filters. In those filters, which are usually composed of ceramic but sometimes also of metal, the exhaust gas to be purified is coercively conducted through a filter material in which entrained soot or carbon particles are deposited. The particles are thermally converted through the use of high exhaust-gas temperatures and possibly a catalytically active coating of the filter material in the particle filter, wherein the catalytic coating reduces the exhaust-gas temperatures required for conversion. Particle filters are typically constructed as honeycomb bodies with alternately closed-off channels. Exhaust gas which enters the particle filter at an inlet side through a channel must thus pass through a channel wall before being able to emerge from the particle filter again at the other side thereof.

One problem with closed particle filters is that they become blocked in the event of inadequate conversion of the soot or carbon particles deposited therein. That occurs, in particular, at low exhaust-gas temperatures. Specifically, the temperatures of the exhaust gases of typical diesel engines are often so low that no conversion of the carbon particles can be obtained even with a suitable catalytic coating of the particle filter. In non-regenerated, blocked particle filters, a pressure gradient is generated across the particle filter, which adversely affects the behavior of the internal combustion engine and is consequently undesirable. For that reason, particle filters must be regenerated. That is usually done by increasing the exhaust-gas temperature. Various methods are known for that purpose. The exhaust-gas temperature can be varied through a change of the fuel/air mixture supplied to the internal combustion engine or through special adjustments of injection or ignition times of the internal combustion engine. The exhaust-gas temperature may alternatively or additionally be increased in the exhaust system itself, for example by an injection of fuel or oxygen into the exhaust line and/or by electric heating of the exhaust gas.

In recent years, open particle separators have been developed as an alternative to closed particle separators. The open particle separators are permeable, that is to say open flow paths exist through the particle separator and particles can also pass through those flow paths. The permeability of open particle separators is generally described on the basis of the diameter of the particles, preferably spheres, which can trickle through them. In European Patent EP 1 440 226 B1, corresponding to U.S. Pat. No. 7,055,314, a particle filter is described as being open if spheres with a diameter of greater than 0.1 mm, preferably greater than 0.2 mm and, in particular, greater than 0.3 mm, can trickle through it.

If appropriate, various deflecting elements for the flow are also provided in the channels of open particle separators. The deflecting elements deflect the flow onto integrated filter surfaces. Alternating smooth filter layers which are composed, for example, of metallic superfine wires, and corrugated metal foils having deflecting surfaces as a secondary structure, are often coiled, wound or stacked to form a honeycomb body. Turbulent flows, which are thus regularly generated in the particle separator, promote the impaction and/or diffusion of the particles in the particle separator.

Open particle separators have the advantage that, even when fully loaded with particles, the exhaust gases can still pass through the particle separator. The particle separator therefore cannot become blocked. The regeneration of open particle separators is often realized through the use of a catalytic coating and nitrogen dioxides which are generated in an oxidation catalytic converter provided in the exhaust line upstream of the particle separator in the flow direction. That process is referred to as the CRT (Continuous Regenerating Trap) process.

It has, however, been found that even open particle filters of that type become loaded with carbon or soot particles over time, in particular at low exhaust-gas temperatures and those particles can possibly undesirably adversely affect function.

SUMMARY OF THE INVENTION

It is accordingly an object of the invention to provide a method for regenerating an open particle separator and a motor vehicle having at least one open particle separator, which overcome the hereinafore-mentioned disadvantages and at least partially solve the highlighted problems of the heretofore-known methods and devices of this general type and which, in particular, disclose a method that is particularly simple to carry out for the adequate regeneration of open particle filters, as well as a device for carrying out the method.

With the foregoing and other objects in view there is provided, in accordance with the invention, a method for regenerating an open particle separator. The method comprises:
 a) determining at least one parameter as a characteristic variable for a regeneration capability of the open particle separator;
 b) comparing the at least one parameter with a first threshold value;
 c) determining at least one portion, of a comparison period, during which the parameter has reached the first threshold value;
 d) comparing the at least one portion with a first minimum portion corresponding to a minimum regeneration time in the comparison period; and
 e) initiating measures for influencing the parameter in such a way that the parameter at least corresponds to the first minimum portion and the first threshold value is reached and/or the open particle separator is regenerated.

The method according to the invention is based on the realization that complete functionality of the open particle separator is ensured if certain minimum conditions, under which the open particle filter (which is also referred to as a partial-flow depth filter) is adequately regenerated, are present for a certain portion of the operating time. For example, the complete functionality of a typical open particle separator is ensured if temperatures of over 250° C. are present for 40% of the operating time.

Therefore, in step a), a parameter is initially determined which reflects the present regeneration capability of the open particle separator. This may, for example, be the temperature prevailing in the particle filter.

In step b), the parameter is now compared with a first threshold value. In the case of the temperature, it would now, for example, be checked whether it is higher or lower than a comparison temperature (for example 250° C.).

In step c), it is thereupon checked how long the condition determined in step b) was present. This always takes place in a comparison period. The comparison period may be defined as required, and may possibly be the last 80 minutes of operation of the internal combustion engine. In this case, it is established, for example, that temperatures of over 250° C. were present in the particle separator during a portion of 50% of the last 80 operating minutes.

In step d), the portion determined in step c) is now compared with a first minimum portion of adequate time for the regeneration, and it is thereby established whether the required regeneration conditions were present. In the case of a 50% portion of the last 80 operating minutes and a required minimum portion of 40%, it is for example established that the required regeneration capability was present for an adequate length of time, and therefore no further measures need be initiated.

If, however, it has been established in step d) that the required first minimum portion has not been reached, then in step e) measures for influencing the parameter are initiated. The aim is for the first minimum portion demanded in step d) to be reached again. In the case of the temperature as a parameter, heating measures for the open particle separator are, for example, initiated.

"Parameters" as characteristic variables for the regeneration capability of an open particle separator may, for example, be the temperatures of the exhaust gas and/or of the open particle separator, pressure differences in the exhaust gas in the exhaust system, volume flow rates of the exhaust gas, nitrogen oxide concentrations ($NO_x$ concentration) or weighted combined parameters. This applies correspondingly to threshold values in step b). Percentage portions of the comparison period are typically used as the portions and the first minimum portions in steps c) and d). It is, however, also possible for absolute times to be compared with one another.

If the temperature in the open particle separator is used as a parameter, temperatures, in particular, of between 200 and 300° C., preferably of approximately 250° C., are taken into consideration as first threshold values in modern known open particle separators which have the conventional catalytically active coatings and possibly an oxidation catalytic converter provided upstream in the exhaust system (CRT process). Consideration is given, in particular, to time portions of 30 to 50%, preferably approximately 40%, of a comparison period as required minimum portions during which the threshold value should be reached.

The adequate regeneration of known open particle separators with such a selection of the parameters, first threshold values and portions, was established by tests within the context of the invention. For future open particle separators, the values must, if appropriate, be adapted to the need for regeneration and regeneration capability thereof.

Typical comparison periods may, for example, be from 5 minutes to 5 hours in length. It is not only comparison periods of fixed length which are conceivable. It is, for example, also possible for the entire operating time since the last start of the connected internal combustion engine to be taken into consideration within the context of the method according to the invention. It is also possible for the operating time since the last start to be taken into consideration as a comparison time directly after the start, and for the comparison period to be set to a fixed length after a certain running time of the internal combustion engine. The comparison time can be revised again after a regeneration of the open particle separator.

The measures initiated in step e) may have two different aims. A first possible aim is for the parameter to be influenced in such a way that the conditions demanded in steps b) and d) (threshold value for first minimum portion) are met. Another approach is for an immediate regeneration of the open particle filter to be attained through the use of a brief, highly intense influencing of the parameter. It is also possible to combine both variants of step e) with one another if required.

Such a brief regeneration of the open particle filter during the comparison period under consideration may be assigned a correction interval for the measured portion of the comparison period, through the use of which correction interval the portion is corrected between step c) and step d) in order to continue to ensure reliable operation of the method according to the invention.

The steps a) to e) disclosed within the context of the method are typically carried out repeatedly at regular intervals in the manner of a loop.

The untreated emissions of the internal combustion engine may additionally be monitored within the context of the method according to the invention. This means, in particular, monitoring of the pollutant content (particle loading, carbon monoxide content and/or $NO_x$ concentration) of the exhaust gases directly at the outlet of the internal combustion engine. If, for example, it is detected there that the particle quantity in the exhaust gas is already acceptable, the influencing of the parameter in step e) may, if appropriate, be temporarily discontinued. Likewise, a delayed regeneration may, if appropriate, be carried out if the $NO_2$ concentration is presently relatively high.

In accordance with another mode of the method of the invention, it is particularly advantageous if the parameter determined in step a) or the portion determined in step c) is stored in a buffer. It is also possible, if appropriate, for both values to be stored in a buffer. This may take place in an integrated circuit and permits a simple implementation of the comparison required in step d) of the method.

In accordance with a further mode of the method of the invention, it is also particularly advantageous if the measures in step e) influence the parameter at least by way of a supply of electrical energy, by an injection of hydrocarbons, or by variation of the ignition behavior of the internal combustion engine. The measures may, if appropriate, also be combined with one another in any desired way.

In the case of the temperature as a parameter, the temperature may easily be increased through the use of the described measures. For example, an electric heating unit in the particle separator itself and/or in the form of an upstream heating catalytic converter can easily increase the temperature. Alternatively, an injection of hydrocarbons (fuel) may take place upstream of the open particle separator either in the exhaust line or in the connected internal combustion through the use of the regular injection system. By varying the ignition behavior of the internal combustion engine, it is possible to realize a situation in which unburned hydrocarbons pass out of the internal combustion engine into the exhaust system, and therefore into the open particle separator with the exhaust gas, and are exothermically converted in the particle separator or in an upstream oxidation catalytic converter, and the desired reaction heat is thereby generated.

In general, in order to influence the parameter in step e), measures may also be implemented which reduce the efficiency of the connected internal combustion engine. An at least partial throttling of the exhaust-gas flow may, for example, take place. Throttling of the intake air which is supplied to the internal combustion engine is also suitable for influencing the parameter.

In accordance with an added mode of the method of the invention, it is also advantageous if the parameter in step b) is additionally compared with a second threshold value, and it is also checked whether or not the first threshold value can be reached through the use of a first measure for influencing the parameter, and the first measure is initiated in step e) only if this is the case.

The background to this is that it can be uneconomical to initiate measures for influencing the parameter if, through the use of such measures, the parameter cannot reach the first threshold value to be reached. An electric heating unit is, for example, capable of increasing the temperature of the exhaust gas of an internal combustion engine by approximately 10° C. If the present temperature in the open particle separator were to lie more than 10° C. below the temperature required for the regeneration, the heating by the described electric heating unit would be unsuccessful. For this reason, by using the comparison with a second threshold value, the possibility of reaching the desired target through the use of a measure is checked, and the measure is initiated in step e) only if this has been confirmed.

The second threshold value introduced in step b) may correspond to a fixed value. In the case of a first threshold value of 250° C. and a capability of an electric heating device to increase the temperature of the exhaust gas by 10° C., the second threshold value would be 240° C. It is, however, also possible for the second threshold value to be defined dynamically. Depending on the exhaust-gas mass flow rate, the temperature-increasing capability of the heating unit may vary. Accordingly, the second threshold value may be made dependent, for example, on the exhaust-gas mass flow rate through the particle separator.

In accordance with a further variant of the method according to the invention, the comparison with the second threshold value may also be carried out with an additional parameter in order to thereby establish whether or not an initiation of measures in step e) is expedient. The $NO_x$ concentration of the exhaust gas, for example, may be monitored. If it is then established that the $NO_x$ concentration of the exhaust gas is not sufficient for regenerating the open particle filter, then no energy-intensive measures for influencing the parameter should be initiated in step e).

In accordance with an additional mode of the method of the invention, it is also advantageous if, in step e), a second measure for influencing the parameter is initiated if it has been established in step b) that the first threshold value cannot be reached through the use of the first measure for influencing the parameter.

If, for example, it has been established that an electric heating device is not capable of attaining the desired temperature in the open particle separator, a different and/or additional measure for increasing the exhaust-gas temperature can be initiated. In this case, measures are expedient, in particular, which involve the injection of hydrocarbons, because it is typically possible to attain large temperature increases in the exhaust gas through the use of such measures.

In accordance with yet another mode of the method of the invention, it is also advantageous if, in step d), a comparison with a second minimum portion is additionally carried out, and it is thereby determined that the first minimum portion could not soon or quickly be reached, and in this case, in step e), measures for influencing the parameter are already initiated before the first minimum portion has not been reached.

If, for example, it is defined as a first minimum portion that the first threshold value should be reached for at least 40%, it is possible through the use of a second minimum portion of 45% to check whether or not the required first minimum portion of, for example, 40% could possibly soon be undershot, for example, taking into consideration the present load of the internal combustion engine. It is expedient in this case if, in step e), measures for influencing the parameter are initiated already in the event of the second minimum portion being undershot, in order to prevent the first minimum portion from being undershot at all. Particularly effective possibilities for influencing the parameter can also be utilized in this way, for example, the temperature in an open particle separator may be preventatively increased whenever it lies slightly below the required threshold temperature.

With the objects of the invention in view, there is concomitantly provided a motor vehicle comprising at least one internal combustion engine, at least one exhaust system, at least one open particle separator, at least one sensor for determining a parameter, at least one regenerator for influencing the parameter, and at least one controller configured or programmed for processing data determined by the at least one sensor and for controlling the at least one regenerator, to carry out the method according to the invention.

The sensor may, for example, be a temperature sensor, a pressure sensor or a lambda probe. The regenerator or regeneration device for influencing the parameter may be an electric heating unit or else an injection device for hydrocarbons in an exhaust system. The controller is typically realized as an integrated circuit.

The invention described herein therefore proposes, in particular, a device and a method for regenerating an open particle separator, wherein at least the following applies:
  a) determining at least one parameter (for example temperature and/or nitrogen dioxide fraction in the exhaust gas, etc.) as a characteristic variable for the regeneration capability (particle conversion capability under present ambient conditions) of the open particle separator;
  b) comparing the at least one parameter with a first threshold value (for example a limit temperature and/or a nitrogen oxide fraction in the exhaust gas, etc.);
  c) determining at least one portion, during which the parameter has reached (in particular undershot or overshot) the first threshold value, of a comparison period (for example a time interval since the start of the internal combustion engine and/or a time interval since the last regeneration of the particle separator and/or a fixed time interval based on the present time, etc.);
  d) comparing the portion with a first minimum portion which corresponds to a minimum regeneration time (for example a (continuous) time interval in which ambient conditions favorable for the continuous regeneration have been present with regard to at least one parameter) in the comparison period; and
  e) initiating measures for influencing the parameter (for example introducing and/or generating heat in the exhaust gas, the particle trap, etc., and/or changing the exhaust-gas composition, for example, by increasing the nitrogen dioxide fraction) in such a way that the parameter lies at least correspondingly to the first minimum portion and the first threshold value is reached (that is to say, in particular, increasing the portion of the comparison time period) and/or the open particle separator is regenerated (for example by virtue of the pressure drop across the particle separator reaching a predefined minimum value).

Other features which are considered as characteristic for the invention are set forth in the appended claims, noting that the features specified individually in the claims may be combined with one another in any desired technologically meaningful way and may be supplemented by explanatory facts from the description in which further structural variants of the invention are presented.

Although the invention is illustrated and described herein as embodied in a method for regenerating an open particle separator and a motor vehicle having at least one open particle separator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
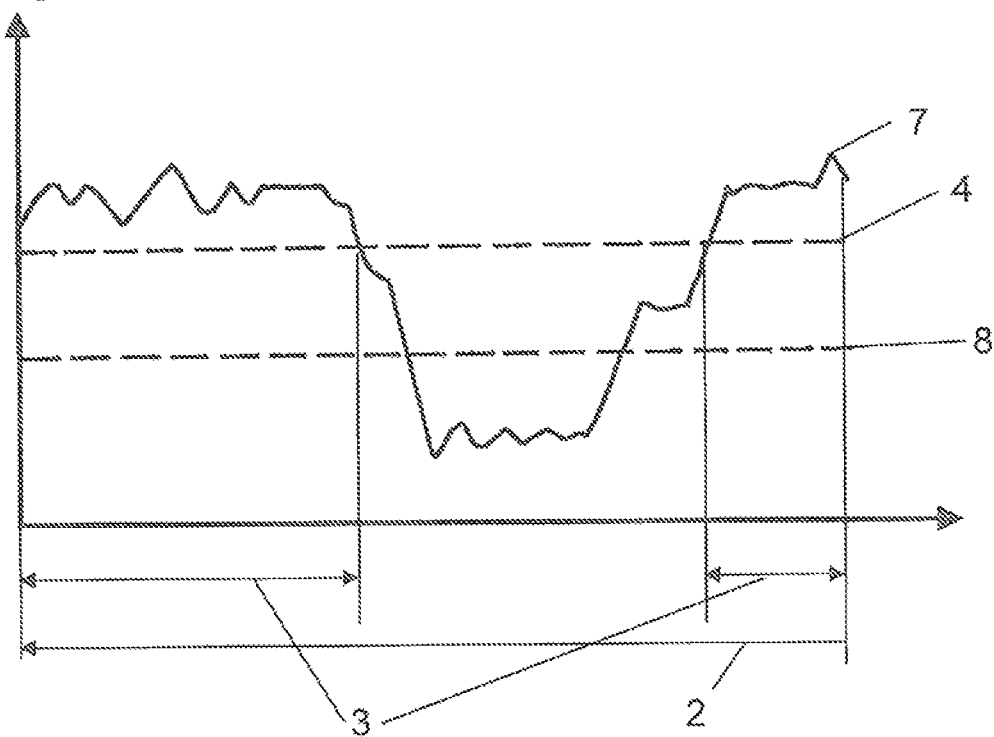
FIG. 1 is a diagram showing a temperature, plotted over time, in an open particle separator.
Figure 2:
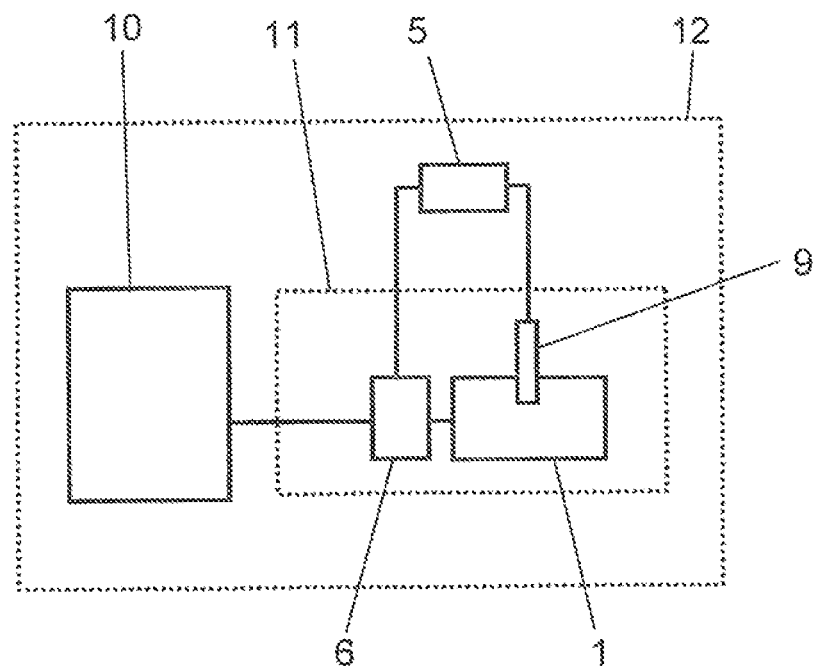
FIG. 2 is a diagrammatic, plan view of a motor vehicle having an exhaust system suitable for carrying out the method according to the invention.

Referring now in detail to the figures of the drawing for explaining the invention and the technical field in more detail by showing particularly preferred structural variants to which the invention is not restricted, and first, particularly, to FIG. 1 thereof, there is seen a diagram in which a vertical axis shows a temperature in an open particle separator 1 shown in FIG. 2. A horizontal axis of the diagram reflects time. A first threshold value 4 and a second threshold value 8 are plotted in the diagram as dashed lines. The first threshold value 4 and the second threshold value 8 each specify limit temperatures, the exceeding or undershooting of which is logged. A course of a parameter 7 over time is plotted in the diagram. A portion or proportion 3 of a comparison period 2, during which the parameter 7 has reached the first threshold value 4, is now marked. An evaluation of such a diagram is carried out in steps a) to d) of the method according to the invention in order to thereby deduce whether measures for influencing the parameter 7 are initiated.

FIG. 2 shows a motor vehicle 12 having an internal combustion engine 10 and an exhaust system 11 which is constructed for carrying out the method according to the invention. For this purpose, the exhaust system 11 has the open particle separator 1 as well as a regenerator or regeneration device 6 for influencing the parameter 7, a sensor 9 and a controller 5. In this case, the sensor 9 is shown as measuring the parameter in the open particle separator 1. It is alternatively also possible to measure the parameter 7 upstream or downstream of the open particle separator 1 or to calculate the parameter from various other measured characteristic variables. In this case, the regenerator 6 is shown upstream of the open particle separator 1 in the flow direction of the exhaust gas.

Figure 3:
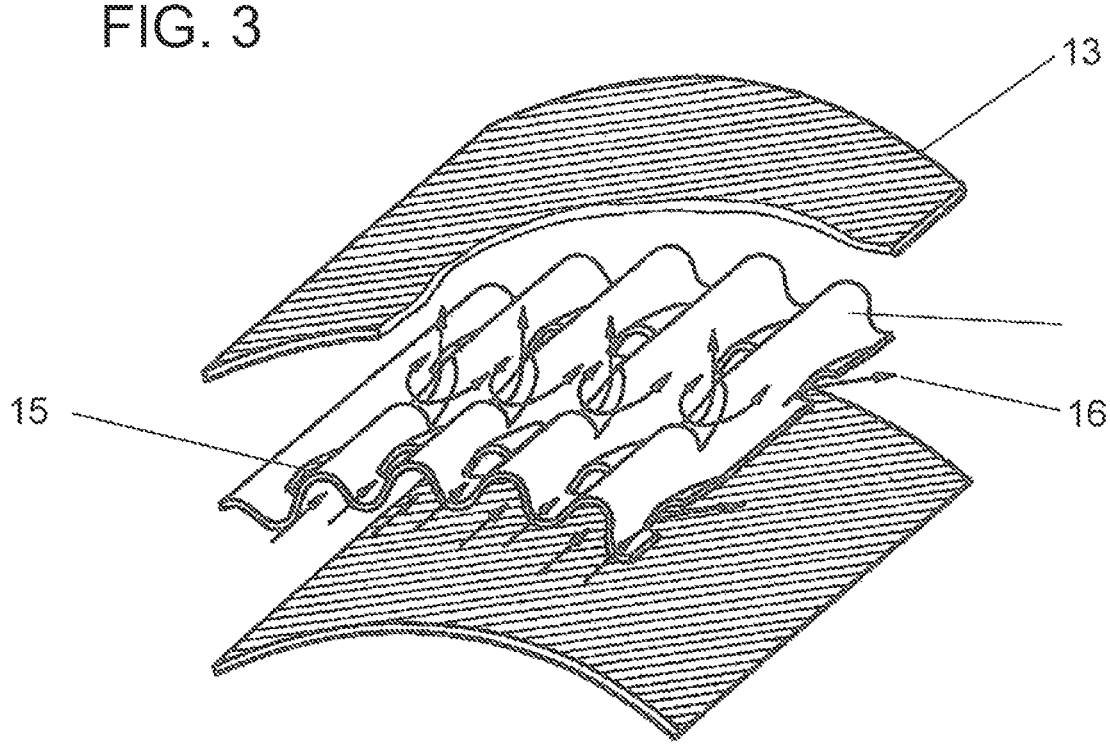
FIG. 3 is a fragmentary, perspective view showing the construction of an open particle separator.

FIG. 3 shows the structure of an open particle separator 1 which can be regenerated through the use of the method according to the invention. An open particle separator 1 of this type is composed typically of corrugated metal foils 14 and filter layers 13. The corrugated metal foils 14 and filter layers 13 are wound or layered to form a honeycomb body with channels through which the exhaust gas can pass. The corrugated metal foils 14 typically have deflecting elements 15 which are suitable for deflecting an exhaust-gas flow 16 at least partially toward the filter layers 13, without thereby completely closing off the channels through which a flow can pass. In this case, turbulence can also be generated in the exhaust-gas flow 16. Entrained particles impact against the filter layers 13. There, the particles are thermally converted, in part with the aid of a catalytically active coating of the open particle separator 1 and/or with the use of nitrogen dioxide which is generated in an upstream oxidation catalytic converter. Detailed descriptions of open particle separators can be found, for example, in German Utility Model DE 201 17 873 U1, corresponding to U.S. Patent Application Publication No. US 2004/0013580 or International Publication No. WO 2004/050219 A1, corresponding to U.S. Pat. No. 7,563,414, which may be taken into consideration herein (individually or together) for detailed definitions and explanations. Such open particle separators are sometimes also referred to as "partial-flow filters."

The method according to the invention for regenerating open particle separators can be implemented in a particularly simple and reliable manner and permits a combination of high exhaust-gas purification reliability and uniform operating conditions for the internal combustion engine, because firstly a functionally capable, absorptive particle separator is ensured, and secondly a blockage of the particle separator is not possible.

The invention claimed is:

1. A method for regenerating an open particle separator, the method comprising the following steps:
   a) determining at least one parameter as a characteristic variable for a regeneration capability of the open particle separator;
   b) comparing the at least one parameter with a first threshold value and additionally comparing the at least one parameter with a second threshold value;
   c) determining at least one portion, of a comparison period, during which the parameter has reached the first threshold value;
   d) comparing the at least one portion with a first minimum portion corresponding to a minimum regeneration time in the comparison period;
   e) initiating measures for influencing the parameter in such a way that the parameter at least corresponds to the first minimum portion and at least one of the first threshold value is reached or the open particle separator is regenerated;
   checking if the first threshold value can be reached by using a first measure for influencing the at least one parameter; and
   initiating the first measure in step e) only if the first threshold value can be reached by using the first measure for influencing the at least one parameter.

2. The method according to claim 1, which further comprises storing at least one of the at least one parameter determined in step a) or the at least one portion determined in step c) in a buffer.

3. The method according to claim 1, which further comprises influencing the at least one parameter with the measures in step e) at least through a supply of electrical energy, an injection of hydrocarbons, or a variation of an ignition behavior of an internal combustion engine.

4. The method according to claim 1, which further comprises initiating a second measure for influencing the at least one parameter in step e) if it has been established in step b) that the first threshold value cannot be reached by using the first measure for influencing the at least one parameter.

5. The method according to claim 4, which further comprises:
- additionally carrying out a comparison with a second minimum portion in step d) to thereby determine if the first minimum portion could not be reached soon; and
- if the first minimum portion could not be reached soon, initiating measures in step e) for influencing the at least one parameter before the first minimum portion has not been reached.

6. A motor vehicle comprising:
- at least one internal combustion engine;
- at least one exhaust system receiving exhaust gas from said at least one internal combustion engine;
- at least one open particle separator in said at least one exhaust system;
- at least one sensor associated with said at least one open particle separator for determining a parameter;
- at least one regenerator in said at least one exhaust system for influencing the parameter; and
- at least one controller configured for processing data determined by said at least one sensor and for controlling said at least one regenerator, said controller configured for carrying out the method of:
  a) determining at least one parameter as a characteristic variable for a regeneration capability of said open particle separator;
  b) comparing the at least one parameter with a first threshold value and additionally comparing the at least one parameter with a second threshold value;
  c) determining at least one portion, of a comparison period, during which the parameter has reached the first threshold value;
  d) comparing the at least one portion with a first minimum portion corresponding to a minimum regeneration time in the comparison period;
  e) initiating measures for influencing the parameter in such a way that the parameter at least corresponds to the first minimum portion and at least one of the first threshold value is reached or said open particle separator is regenerated;
- checking if the first threshold value can be reached by using a first measure for influencing the at least one parameter; and
- initiating the first measure in step e) only if the first threshold value can be reached by using the first measure for influencing the at least one parameter.

* * * * *